Figure 1:
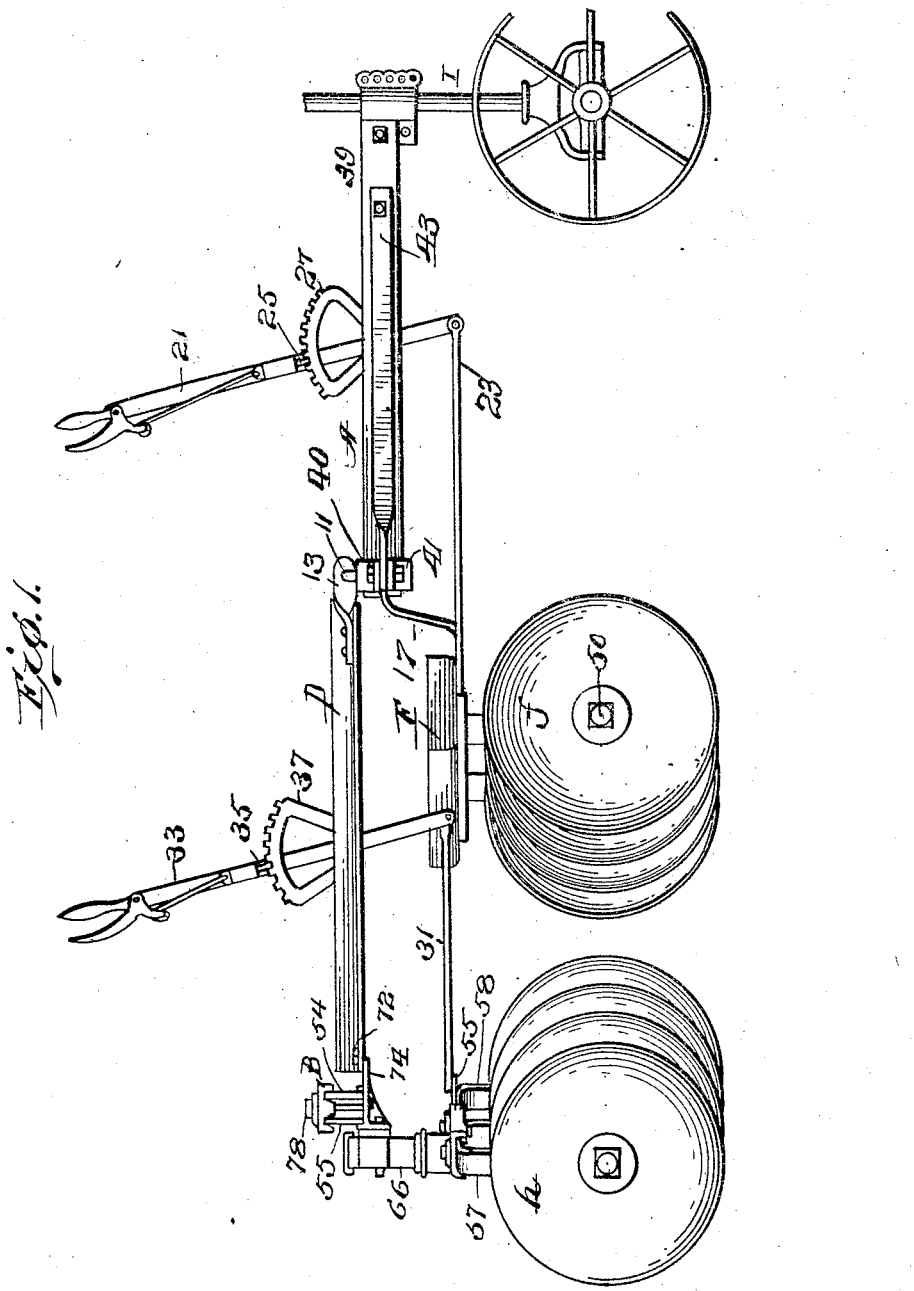

C. T. RAY.
HARROW.
APPLICATION FILED AUG. 14, 1914.

1,186,130.

Patented June 6, 1916.
3 SHEETS—SHEET 1.

Witnesses
J. M. Fowler Jr.
A. S. Stockman

Inventor
C. T. Ray
By C. J. Stockman
Attorney

C. T. RAY.
HARROW.
APPLICATION FILED AUG. 14, 1914.

1,186,130.

Patented June 6, 1916.
3 SHEETS—SHEET 3.

Witnesses
J. M. Fowler Jr.
G. Stockman

Inventor
C. T. Ray
By C. J. Stockman
Attorney

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

HARROW.

1,186,130.      Specification of Letters Patent.      Patented June 6, 1916.

Application filed August 14, 1914. Serial No. 856,807.

*To all whom it may concern:*

Be it known that I, CHARLES T. RAY, a citizen of the United States, residing at Louisville, in the county of Jefferson and State of Kentucky, have invented new and useful Improvements in Harrows, of which the following is a specification.

This invention has relation to farm implements such as harrows, cultivators and the like, of the type having a series of gangs of cutting elements relatively so arranged as to provide one pair of gangs disposed at opposite sides of the line of draft and a second pair of gangs respectively arranged behind the gangs of the first pair. A two-way disk harrow best represents the type of implements to which the present invention has general reference and, for this reason, has been selected to exemplify the same.

The invention forming the subject of this application has more particular reference to the class of such implements wherein the rear gangs of cutting elements are mounted on frames which are connected by vertical pivots to a frame which is laterally movable with respect to the front frame carrying the front gangs of cutting elements, and one of the objects of the present invention is to provide a correlation of parts such that when, during the forward travel of the implement, the rear frame shifts laterally, to either the right or left, from its position centrally behind the front frame—or other predetermined position with relation to the front frame—the frames which carry the rear gangs of cutting elements respectively will be automatically adjusted on their pivots relatively to each other and to the said rear frame, thereby changing their angular relation to the rear frame and the angular relationship of the rear gangs of cutting elements to each other and to the line of draft, the parts being further so arranged that this change in the angular relationship of the cutting elements to the line of draft will be such as to cause the rear frame with the gang frames and cutting elements carried thereby to be automatically restored to their proper positions with respect to the front frame and gangs.

Another, and a more important, object of this invention is to provide a correlation of parts such that lateral shifting of the rear frame from its predetermined position will not only cause automatic adjustment of the rear gang frames pivotally with reference to said rear frame but further will cause the rear frame to assume a different angular relationship to the front frame and line of draft, the change in the angular relationship of the rear frame to the line of draft and the change of the angular relationship of the rear gang frames to the rear frame being such that they coöperate with each other in the restoration of the rear cutting elements to their proper positions with respect to the front cutting elements in the shortest possible space of time.

These purposes, and others which will hereafter appear, are fully accomplished by the construction illustrated in the accompanying drawings which exemplify the preferred embodiment of the invention. It should be understood, however, that the invention is not restricted to the herein illustrated embodiment and that it may be otherwise and variously embodied without departing from its spirit or the scope of the subjoined claims.

Figure 2:
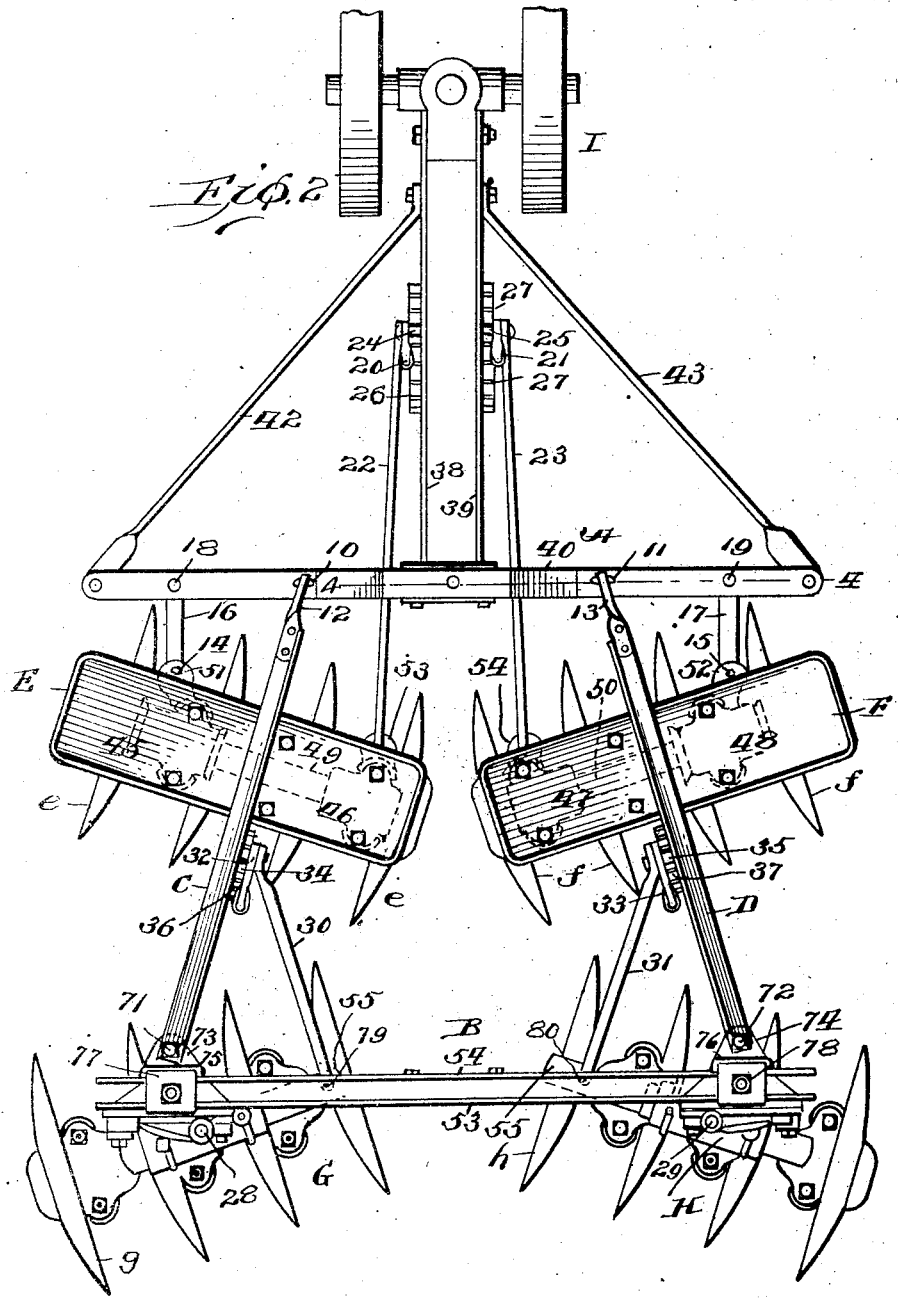
Figure 3:
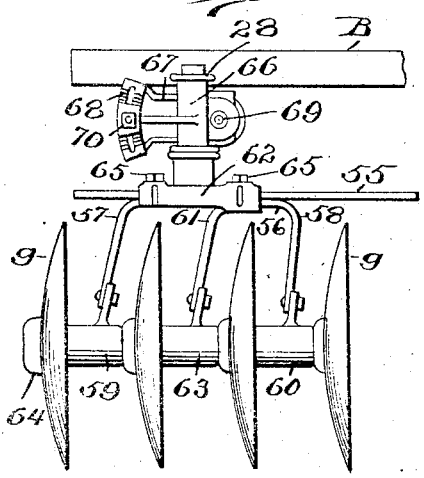
Figure 4:
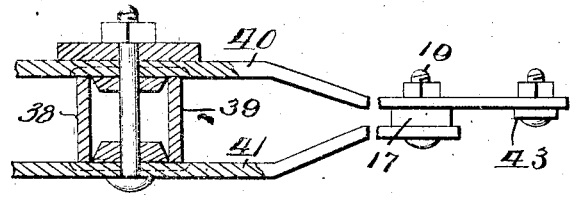
Figure 5:
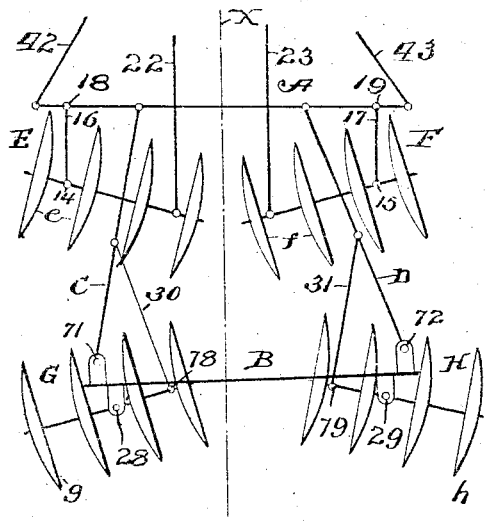
Figure 6:
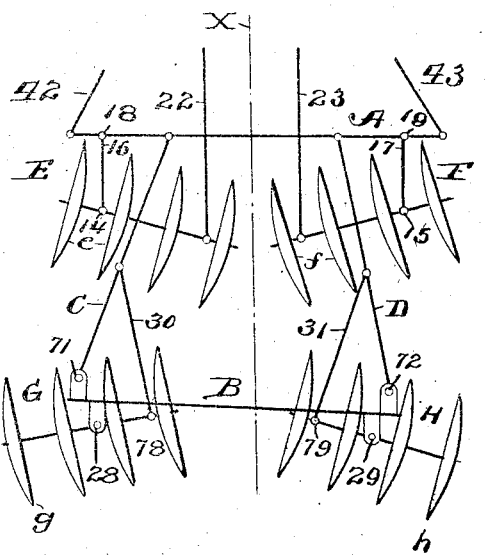

In the drawings, wherein like characters of reference denote corresponding parts in the several views; Figure 1 is a side elevation of a two-way disk harrow embodying the present improvements; Fig. 2 is a plan view of the same; Fig. 3 is a detail rear elevation showing one of the rear gang frames, a gang of disks connected to said gang frame and a part of the rear frame to which said gang frame is pivotally connected; Fig. 4 is a section on the line 4—4 of Fig. 2; and Figs. 5 and 6 are views showing diagrammatically the positions of the parts when the rear frame is shifted laterally; Fig. 5 showing the position of the parts when the frame is shifted to the right, and Fig. 6 showing the position of the parts when the frame is shifted to the left of the normal central position indicated by the broken line marked X in said figures.

The implement constituting the present invention includes a front frame A and a rear frame B. These frames are connected with each other by a pair of links C and D each of which extends from the front frame to the rear frame, the forward ends of the links being pivoted to the front frame A, and the rear ends of the links being pivoted to the rear frame B. The pivotal connections of the links with the front frame A are of a character such that the links may swing in horizontal and vertical planes with reference to said frame. A form of universal connection suitable for the purpose is herein exemplified, said connection being composed of hooks 10 and 11 suitably secured to the front frame A and apertured projections, or eyes, 12 and 13 which are connected to the forward ends of the links C and D and loosely receive the hooks 10 and 11, respectively. These links form a medium of connection between the rear frame B and the front frame A which permits the rear frame to swing laterally as well as vertically.

Pivotally connected to the front frame A are a pair of frames E and F which respectively carry a gang of suitable soil cutting elements, as the rotary disks $e$ and $f$, for example, relatively so arranged that one gang of disks will throw the soil in one direction while the other gang of disks will throw the soil in the other direction. The frames E and F, hereinafter called "gang frames," may be of any suitable construction and they are arranged so that their cutting elements, respectively, will normally be on opposite sides of the longitudinal center of the implement, indicated by the line X. They are so mounted that they may be manually adjusted on vertical axes in order correspondingly to adjust the angle of the disks with reference to each other and to the line of draft, and suitable means are provided for facilitating their manual adjustment to various selected positions and for locking them in their adjusted positions.

In the herein exemplified form of the invention the gang frames E and F are of the weight-box type and are connected by vertical pivots 14 and 15 respectively to two members 16 and 17, which members project rearward from the frame A and are suitably secured to the latter at 18 and 19, respectively. The means preferably employed for adjusting the disk gang frames comprise two levers 20 and 21 suitably mounted on the front frame A and connected by links 22 and 23, respectively, with the frames E and F, the said levers being provided with suitable latches 25 which respectively coöperate with toothed sectors 26 and 27 for holding them and the frames E and F in various selected positions of adjustment relatively to the line of draft.

The rear frame B similarly is provided near its opposite ends with two gang frames G and H which are pivoted thereto on vertical axes, shown at 28 and 29, and these gang frames are provided with suitable soil cutting elements, as the gangs of disks $g$ and $h$, respectively arranged behind the gangs of disks $e$ and $f$ and set to throw the soil in reverse directions with respect to each other and to the gangs behind which they are respectively disposed.

The gang frames G and H—being carried by the frame B—partake of the lateral shifting movements of the latter, the said lateral shifting movements occurring by reason of the non-rigid character of the connection between the rear frame B and the front frame A and being of advantage in turning corners, but should be corrected in straight-ahead work. To the means for correcting this by restoring the rear frame to its predetermined position with relation to the front frame for straight-ahead work, this invention, as already stated, is mainly directed. To this end, the gang frames G and H are provided with suitable means— as the connecting rods 30 and 31, for example—by which they are connected with an appropriate part of the implement, the correlation of the parts being such that when the rear frame B is shifted laterally, the connecting rods 30 and 31 will serve to turn the rear disk frames G and H on their vertical axes 28 and 29 automatically— one frame in a direction the reverse of the other. The angles of the cutting elements $g$ and $h$ with reference to each other and to the rear frame and line of draft are thereby changed to position wherein the pressure of the soil against them causes them to return to their former angles, thereby restoring the rear frame B to its predetermined position with reference to the front frame A.

In order that this restoration of the rear frame relatively to the front frame may be more quickly brought about the side links C and D are disposed so that the lateral movements of the rear frame will be at an angle—as contradistinguished from parallel—to the front frame. This is brought about preferably by setting the side links at slightly diverging angles from their front ends to their rear ends. It is only necessary, however, in order to bring about the desired angular shifting of the rear frame relatively to the front frame, that the links to be set obliquely of the implement in non-parallel planes and other arrangements of said links than the one herein particularly illustrated are considered to be within the spirit of this part of the invention.

It will be noted that by the arrangement referred to, the change of the angles of the rear disk gangs with reference to the line of draft is brought about first by the change of the angles of the rear frame relatively to the line of draft and second by the change of the angle of the gangs of disks relatively to each other and to the rear frame; and it will be further noted that the correlation of the parts is such that these changes are very quickly brought about, thereby making the implement very sensitive. In order to further increase this sensitiveness of the implement, it is preferred to connect the forward ends of the connecting links 30 and 31 with the side links C and D respectively, as herein shown.

In the herein exemplified form of the invention the connecting links 30 and 31, moreover, form elements of means whereby the disk frames G and H may be separately and manually adjusted into different positions, according to the character of the soil, and locked to the side links C and D respectively: said connecting rods being shown as having their forward ends pivoted to manually-operable levers 32 and 33 which are pivotally mounted upon the side links C and D and are provided with latches 35 which are arranged to engage any one of a series of teeth formed on sectors 36 and 37 secured to the side links C and D, respectively.

It will thus be noted that the restoration of the rear frame to its predetermined position with relation to the front frame for straight-ahead work is accomplished in the most practicable way by the embodiment of the invention herein particularly illustrated, for the reason that if the rear frame moves laterally—to the right for example, (see Fig. 5) the rear end of the right hand link D, being farther from the center of the rear frame B than the front end of the link is from the center of the front frame A, the link D will shorten the distance between the two frames at this side of the implement, and at the same time the link C at the left-hand side will lengthen the distance between the front and rear frames at its side of the implement, wherein the rear frame B is thrown at an angle creating a tendency to bring it back to the center. In addition to this, the inside end of the right-hand disk frame H is forced back by the connecting rod 31 while the inside end of the other disk frame, G, is brought forward by the connecting link 30, whereby the angles of the disk frames relatively to the rear frame B are separately moved in directions to bring the rear harrow frame toward the center. The rear frame is thus very quickly brought back to its predetermined position, notwithstanding its entire lack of rigidity. Obviously, if the rear frame shifts to the left (see Fig. 6), a similar operation occurs—the link C shortening the distance between the two frames at the left-hand side and the link D lengthening the distance between the two frames at the right hand side, while the inside end of the right-hand disk frame is brought forward and the inside end of the left-hand disk is thrust rearward by the links 30 and 31 respectively.

The term "frame" when used herein with reference to each of the parts "A", "B", "G" and "H" is intended to be construed broadly as including any means—whether consisting each of a single element or of a plurality of elements connected to each other—suitable for the purpose. I prefer, however, the particular constructions of these parts herein illustrated and which will now be set forth in detail.

The front frame A preferably comprises two members 38 and 39 which extend longitudinally of the implement and whose rear ends are attached to upper and lower members 40 and 41, at about the center of the latter, the said upper and lower members extending transversely of the implement. Diagonal braces 42 and 43 connect the outer ends of the members 40 and 41 with the members 38 and 39 respectively, near the front of the latter. A tongue truck I of suitable construction is preferably connected to the forward ends of the members 38 and 39, and said members 38 and 39 carry the operator's seat (not shown). The weight boxes which preferably form parts of the gang frames E and F are provided with bearings 45, 46, 47 and 48 which depend therefrom and through which the shafts 49 and 50 of the gangs e and f extend. The members 16 and 17 connect the weight boxes with the transverse members 40, 41 of the frame A and have their rear ends pivotally attached at 14 and 15 to lugs 51 and 52 extending from the outer bearings 45 and 48 respectively, while the rods 22 and 23 have their rear ends attached to similar lugs 53 and 54 extending from the inner bearings 46 and 47, respectively. The levers 20 and 21 are pivotally connected to the members 38 and 39 of the frame A, and, as already stated, they are operable to adjust the frames E and F to various angular relations with respect to each other, the said frames E and F while being adjusted turning upon the pivots 14 and 15, which connect the rear ends of the members 16 and 17 with the lugs 51 and 52 respectively. The sectors 26 and 27 also are attached to the members 38 and 39 of the frame A.

The rear frame B is preferably composed of spaced members 53 and 54 suitably connected together, and extends continuously across the implement. The disk carrying frames G and H, are of identical construction and a description of one will answer for both. As shown most clearly in Fig. 3, the frame comprises a cross bar 55 to which is clamped a yoke 56 whose depending ends 57 and 58 are provided at their lower ends with sleeves 59 and 60. A standard, 61, which is arranged between the depending ends 57 and 58 of the yoke has its upper end bent and secured to the cross bar 55 by the clamp which also secures the yoke 56 to said bar. This clamp is marked 62. The lower end of the standard 61 carries a sleeve 63. The sleeves 59, 60 and 63 form bearings for the shaft 64 which supports the gang of disks $g$ or $h$ and are arranged to space said disks from each other. The clamp 62 is adjustable longitudinally of the cross bar 55 and means, as the bolts 65, are provided for securing it in its adjusted position. This permits the distance between the gangs of disks $g$ and $h$ to be varied. The clamp 62 has a vertical extension which forms the pivot (28 or 29) hereinbefore referred to as being the axis of turning movement of the rear gang frame (G or H) relatively to the frame B and this pivot extends through a sleeve 66 which has a lateral member 67 provided with a toothed sector 68. The gang frame (G or H) is also pivoted at 69 whereby it may be turned on a horizontal axis so as to adjust the gang of disks relatively to the frame B into different selected position inclined to the soil, and is held in its selected position by a lug 70 which engages the sector 68.

The rear ends of the side links C and D preferably are pivoted at 71 and 72 respectively (see Fig. 2) to lugs 73 and 74 which project forward from the castings 75 and 76, the said castings being preferably mounted so that they can be adjusted longitudinally of the members 53 and 54 and being fixed in adjusted position by the clamp nuts 77 and 78. The connecting rods 30 and 31 have their rear ends pivoted at 79 and 80 respectively to the inner ends of the transverse bars 55 of the disk gangs G and H and their forward ends, as already stated, in the herein exemplified form of the invention, are pivoted to the lower ends of the adjusting levers 32 and 33.

Having now described the invention what I believe to be new and desire to secure by Letters Patent is:

1. The combination with front and rear frames, a plurality of gang frames pivotally connected to the front frame and a plurality of gang frames pivotally connected to the rear frame, of a connecting mechanism arranged to permit the rear frame to shift laterally relatively to the front frame and to cause the angles of the rear gang frames with relation to each other and to the rear frame to be automatically varied by the lateral shifting movements of the rear frame, the said connecting mechanism having forward ends which are pivotally connected to the front frame and rear ends which are pivotally connected to the rear frame and to the rear gang frames.

2. The combination with front and rear frames, a pair of links connecting the rear frame to the front frame and arranged to permit the rear frame to shift laterally relatively to the front frame, of a pair of gang frames pivotally connected to the front frame, a second pair of gang frames pivotally connected to the rear frame, and connections to the rear gang frames arranged to cause the angles of the same with relation to each other and to the rear frame to be automatically varied by the lateral shifting movements of the rear frame.

3. The combination with a front frame, a rear frame, a pair of gang frames pivotally connected to the front frame and a second pair of gang frames pivotally connected to the rear frame, of a pair of links connecting the rear frame to the front frame, said links being arranged in non-parallel planes and permitting the rear frame to swing laterally into angular relation to the front frame, and connections to the rear gang frames for causing the angles of the same with relation to each other and to the rear frame to be automatically varied by the lateral shifting movements of the rear frame.

4. The combination with a front frame, a rear frame, a pair of gang frames pivotally connected to the front frame and a second pair of gang frames pivotally connected to the rear frame, of a pair of links connecting the rear frame to the front frame, said links being arranged in non-parallel planes and permitting the rear frame to swing laterally into angular relation to the front frame, and connections between the rear gang frames and the links, respectively, the said connections being arranged to cause the angles of the rear gang frames with relation to each other and to the front frame to be automatically varied by the lateral shifting movements of the rear frame.

5. The combination with a front frame, a rear frame, a pair of gang frames pivotally connected to the front frame and a second pair of gang frames pivotally connected to the rear frame, of a pair of links connecting the rear frame to the front frame, said links being arranged diagonally with their rear ends a greater distance apart than their front ends, and connections between the rear gang frames and the links, said connections diverging forwardly from the rear gang frames to the links.

6. The combination with a front frame and a rear frame, a pair of gang frames pivotally connected with the front frame, and a second pair of gang frames pivotally connected with the rear frame, of a pair of links connecting the rear frame to the front frame, adjusting levers carried by said links, connections between the said levers and the rear gang frames and means for locking the levers in various selected positions, said levers, locking means and connections being operatively arranged to permit the rear gang frames to be set manually at different selected angular positions for work and to cause the said angular positions of the same with relation to each other and to the rear frame to be automatically varied when the rear frame shifts laterally.

7. The combination with a front frame and a rear frame, a pair of gang frames pivotally connected with the front frame, and a second pair of gang frames pivotally connected with the rear frame, of a pair of links arranged in non-parallel planes and connecting the rear frame to the front frame, adjusting levers carried by said links, connections between the said levers and the rear gang frames and means for locking the levers in various selected positions, said levers, locking means and connections being operatively arranged to permit the rear gang frames to be set manually at different selected angular positions for work and to cause the said angular positions of the same with relation to each other and to the rear frame to be automatically varied when the rear frame shifts laterally.

8. The combination with a front frame, a rear frame, a pair of gang frames pivotally connected to the front frame and a second pair of gang frames pivotally connected to the rear frame, of a pair of links connecting the rear frame to the front frame, said links being arranged diagonally with their rear ends a greater distance apart than their front ends, adjusting levers pivoted to said links, rods extending convergently from the lower ends of said levers to the inner portions of the rear gang frames and means for locking the levers in various selected positions to the links.

In testimony whereof I have hereunto set my hand in presence of two subscribing witnesses.

CHARLES T. RAY.

Witnesses:
J. FRED HARTKEMEIER, Jr.,
WM. M. JOHNSTON.